(12) United States Patent
Hatamoto

(10) Patent No.: US 10,578,365 B2
(45) Date of Patent: Mar. 3, 2020

(54) HEAT EXCHANGING APPARATUS

(71) Applicant: Hiroshi Hatamoto, Gunma (JP)

(72) Inventor: Hiroshi Hatamoto, Gunma (JP)

( * ) Notice: Subject to any disclaimer, the term of this patent is extended or adjusted under 35 U.S.C. 154(b) by 8 days.

(21) Appl. No.: 16/071,930

(22) PCT Filed: Jan. 23, 2017

(86) PCT No.: PCT/JP2017/002108
§ 371 (c)(1),
(2) Date: Jul. 23, 2018

(87) PCT Pub. No.: WO2017/130898
PCT Pub. Date: Aug. 3, 2017

(65) Prior Publication Data
US 2019/0033001 A1 Jan. 31, 2019

(30) Foreign Application Priority Data

Jan. 25, 2016 (JP) .................. 2016-011529

(51) Int. Cl.
*F28D 3/02* (2006.01)
*F28F 9/013* (2006.01)
(Continued)

(52) U.S. Cl.
CPC .................. *F28D 3/02* (2013.01); *F24H 9/00* (2013.01); *F28D 1/0477* (2013.01); *F28D 7/082* (2013.01);
(Continued)

(58) Field of Classification Search
CPC .......... F28D 3/02; F28D 1/0477; F28D 7/082; F28F 9/001; F28F 9/002; F28F 25/05; F28F 2020/0078; F28F 2280/02; F28F 2280/06
See application file for complete search history.

(56) References Cited

U.S. PATENT DOCUMENTS

2006/0196450 A1 9/2006 Le Mer et al.
2007/0175617 A1* 8/2007 Brost .................. F02B 29/0462
165/149
(Continued)

FOREIGN PATENT DOCUMENTS

DE 627 637 C 3/1936
JP H10-096504 A 4/1998
(Continued)

OTHER PUBLICATIONS

Extended European Search Report, European Patent Office, dated Dec. 19, 2018.

*Primary Examiner* — Jon T. Schermerhorn, Jr.
(74) *Attorney, Agent, or Firm* — Bay State IP, LLC

(57) ABSTRACT

A case of a heat exchanging apparatus includes an opening section provided on the sidewall and a plate-like lid member for opening and closing the opening section. A heat exchange section of a heat transfer medium circulation pipe is fixed to the inner surface of a lid member via a frame body formed by combining bar-like members. When the lid member is at a position where the opening section is closed, the heat exchange section of the heat transfer medium circulation pipe is housed fixedly in the case, and when the lid member is at a position where the opening section is open, the heat exchange section of the heat transfer medium circulation pipe is withdrawn from the opening section out of the case. This can reduce labor for cleaning and maintenance of the apparatus effectively and improve efficiency of heat exchange of the apparatus.

5 Claims, 6 Drawing Sheets

(51) Int. Cl.
  *F24H 9/00* (2006.01)
  *F28D 1/047* (2006.01)
  *F28F 25/04* (2006.01)
  *F28F 9/00* (2006.01)
  *F28D 7/08* (2006.01)
  *F28D 20/00* (2006.01)

(52) U.S. Cl.
  CPC .......... *F28D 20/0034* (2013.01); *F28F 9/001* (2013.01); *F28F 9/002* (2013.01); *F28F 9/0132* (2013.01); *F28F 25/04* (2013.01); *F28D 2020/0078* (2013.01); *F28F 2009/004* (2013.01); *F28F 2280/02* (2013.01); *F28F 2280/06* (2013.01); *Y02E 60/142* (2013.01)

(56) References Cited

U.S. PATENT DOCUMENTS

| | | | |
|---|---|---|---|
| 2008/0149315 A1 | 6/2008 | Hata et al. | |
| 2009/0014151 A1* | 1/2009 | Capelle | F28D 7/06 165/44 |
| 2010/0326639 A1 | 12/2010 | Ando | |
| 2014/0130764 A1* | 5/2014 | Saumweber | F02B 29/045 123/184.21 |
| 2014/0318120 A1* | 10/2014 | Svihla | F02B 29/0406 60/599 |
| 2017/0108283 A1* | 4/2017 | Devedeux | F02B 29/0462 |
| 2018/0051941 A1* | 2/2018 | Army | F28D 9/0025 |
| 2018/0058775 A1* | 3/2018 | Betti | F28D 7/1607 |

FOREIGN PATENT DOCUMENTS

| | | |
|---|---|---|
| JP | 2006-503260 | 1/2006 |
| JP | 2008-151474 | 7/2008 |
| JP | 2011-07420 | 1/2011 |
| JP | 5626522 B | 8/2011 |
| JP | 2012-017905 | 1/2012 |
| JP | 2012-072996 A | 4/2012 |
| JP | 2013-133956 | 7/2013 |
| JP | 2014-214987 | 11/2014 |

* cited by examiner

HEAT EXCHANGING APPARATUS

CROSS REFERENCE TO RELATED APPLICATION

This application is for entry into the U.S. National Phase under § 371 for International Application No. PCT/JP2017/002108 having an international filing date of Jan. 23, 2017, and from which priority is claimed under all applicable sections of Title 35 of the United States Code including, but not limited to, Sections 120, 363, and 365(c), and which in turn claims priority under 35 USC 119 to Japanese Patent Application No. 2016-011529 filed on Jan. 25, 2016.

TECHNICAL FIELD

The present invention relates to a heat exchanging apparatus, for example, of the falling liquid film type for cooling high temperature fluid by heat exchange with a refrigerant such as tap water while the high temperature fluid is flown down in the liquid film form by its dead weight.

BACKGROUND ART

Patent Document 1 discloses a conventional heat exchanging apparatus of the above-described falling liquid film type. The heat exchanging apparatus disclosed in Patent Document 1 includes a falling through hole provided on a bottom of a storage tank and a heat transfer medium circulation pipe suspended from the storage tank. And, the heat exchanging apparatus is structured to exchange heat with a heat transfer medium circulating in the heat transfer medium circulation pipe while dropping heated fluid from the falling through hole to be distributed and flown down in the liquid film form following an outer surface of the heat transfer medium circulation pipe. As this heat exchanging apparatus can perform heat exchange between the heated fluid and the heat transfer medium efficiently, cooling processing, for example, of hot water can be performed quickly and surely.

RELATED ART DOCUMENTS

Patent Documents

[Patent Document 1] Japanese Patent No. 5626522

DISCLOSURE OF THE INVENTION

Problems to be Solved by the Invention

The heat exchanging apparatus disclosed in Patent Document 1 is structured so that the heat transfer medium circulation pipe is attached to a housing (case). This makes it difficult to clean and maintain the heat transfer medium circulation pipe. In addition, the improvement, for example, of the fixing structure of the heat transfer medium circulation pipe may lead to the improvement of efficiency of heat exchange using the heat exchanging apparatus.

The present invention was made in view of an above-mentioned point, and its purpose is to provide the heat exchanging apparatus that can reduce labor for cleaning and maintenance of the apparatus effectively and improve efficiency of the heat exchange of the apparatus.

Means of Solving the Problems

To solve the above-described problem, the present invention provides a heat exchanging apparatus including a boxy case open upward and a heat exchange unit having a heat transfer medium circulation pipe that is at least in part installed in the case. The heat exchanging apparatus performs heat exchange between heated fluid guided into the case and a heat transfer medium circulating in the heat transfer medium circulation pipe. The case includes an opening section provided on the sidewall thereof and a plate-like lid member for opening and closing the opening section. The heat transfer medium circulation pipe of the heat exchange unit has a heat exchange section wound in a spiral. The heat exchange section of the pipe is fixed to the inner surface of the lid member via a frame body formed by combining bar-like members. Both ends of the heat transfer medium circulation pipe penetrate the lid member and project outside the case. On one hand, when the lid member is at a position where the opening section is closed, the heat exchange section of the heat transfer medium circulation pipe is housed fixedly in the case. On the other hand, when the lid member is at a position where the opening section is open, the heat exchange section of the heat transfer medium circulation pipe is withdrawn from the opening section out of the case.

According to the heat exchanging apparatus in accordance with the present invention, when the lid member is at a position where the opening section is closed, the heat exchange section of the heat transfer medium circulation pipe is housed fixedly in the case, and when the lid member is at a position where the opening section is open, the heat exchange section of the heat transfer medium circulation pipe is withdrawn from the opening section out of the case. Thus, at the time of cleaning and maintenance of the heat exchanging apparatus, the heat exchange section of the heat transfer medium circulation pipe can be withdrawn out of the case only by positioning the lid member at the open position and then opening the opening section. This enables highly efficient cleaning and maintenance of the heat exchanging apparatus.

Furthermore, according to this heat exchanging apparatus, the heat exchange section of the heat transfer medium circulation pipe is fixed to the inner surface of the lid member using the frame body formed by combining the bar-like members. Thus, contrary to the heat exchange section of the heat transfer medium circulation pipe structured not to be fixed in the case, the pipe of the heat exchange section of the present invention is arranged orderly. This enables more uniform heat exchange between the heat transfer medium circulating in the heat transfer medium circulating pipe and the heated fluid. Thus, the efficiency of heat exchange using the heat exchanging apparatus (efficiency of heat recovery) can be improved effectively.

Furthermore, the heat exchange section of the heat transfer medium circulation pipe is fixed to the inner surface of the lid member via the frame body formed by combining the bar-like members. Thus, no deviation occurs to the installation position of the heat exchange section of the heat transfer medium circulation pipe when opening and closing the lid member. Therefore, only by arranging the lid member at the closed position, the heat exchange section of the heat transfer medium circulation pipe can be positioned accurately at a desired position in the case. This also can avoid any deviation from occurring to the position of the heat exchange section of the heat transfer medium circulation pipe installed in the case while using the apparatus.

Moreover, in the above-described heat exchanging apparatus, the frame body may be structured to be fixed by fastening a bolt so that the heat exchange section of the heat transfer medium circulation pipe is sandwiched from both sides in the axial direction of the spiral winding thereof.

According to this configuration, as adjacent parts of the spirally wound heat exchange section of the heat transfer medium circulating pipe can be surely contacted with each other, the flow of the heated fluid circulating around the heat transfer medium circulating pipe can be made uniform. Thus, the efficiency of heat exchange (efficiency of heat recovery) using the heat exchanging apparatus can be much more improved.

Moreover, the above-described heat exchanging apparatus may be structured so that the lid member and the heat exchange unit fixed to the lid member slidably move toward and from the opening section of the case.

According to this configuration, the heat exchange unit fixed to the lid member can slide in and out of the case with a simple configuration.

Furthermore, the above-described heat exchanging apparatus should include a sealing member for sealing a gap between the lid member at the closed position and the opening section.

According to this configuration, as the gap between the lid member and the opening section is surely sealed by arranging the lid member at the closed position, the heated fluid in the case can be surely prevented from leaking from the opening section out of the case.

Furthermore, the above-described heat exchanging apparatus may be the falling liquid film type for exchanging heat with the heat transfer medium circulating in the heat transfer medium circulation pipe while dropping the heated fluid from an opening of the case open upward into the case so as to be distributed and flown down in the liquid film form following the outer surface of the heat transfer medium circulation pipe. Also, in this case, a heated fluid storage tank is installed on the upper part of the case for storing the heated fluid. The heated fluid storage tank should be configured to drop a constant amount of the heated fluid onto the heat transfer medium circulation pipe of the case.

In the heat exchanging apparatus of the present invention, the pipe of the heat exchange section is arranged orderly, or in other words, the adjacent parts of the spirally wound heat exchange section of the heat transfer medium circulation pipe are surely contacted with each other. Therefore, if the structure of the present invention is applied to the falling liquid film-type heat exchanging apparatus, the heated liquid can be more uniformly distributed and flown down in the liquid film form following the outer surface of the heat transfer medium circulation pipe. This enables highly efficient heat exchange with the heat transfer medium circulating in the heat transfer medium circulation pipe.

Effect of the Invention

The heat exchanging apparatus of the present invention, provided with the above-described configuration, can reduce labor for cleaning and maintenance of the apparatus effectively and improve efficiency of the heat exchange of the apparatus.

MODE FOR CARRYING OUT THE INVENTION

Figure 1:
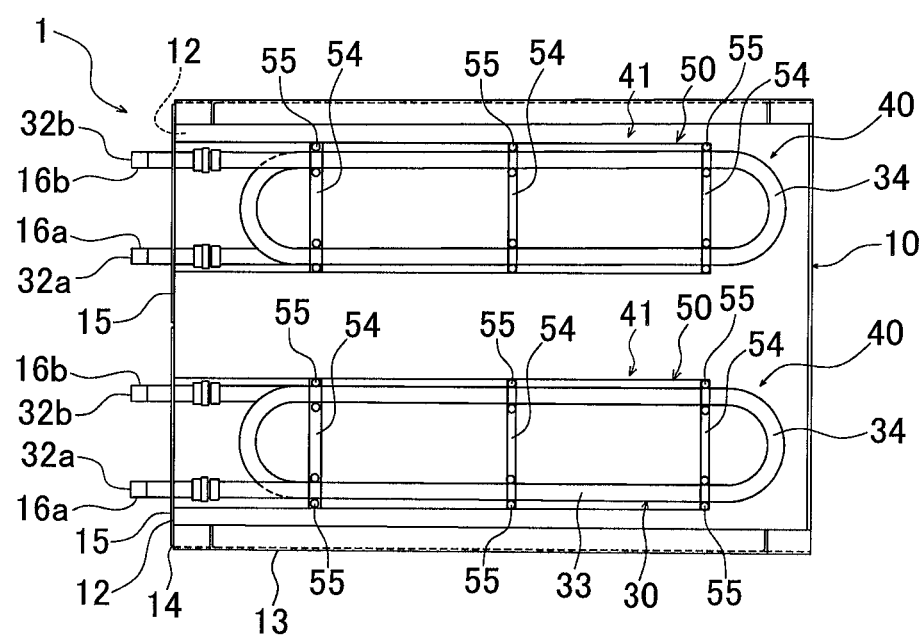
FIG. 1 is a plan view illustrating a heat exchanging apparatus according to one embodiment of the present invention.
Figure 2:
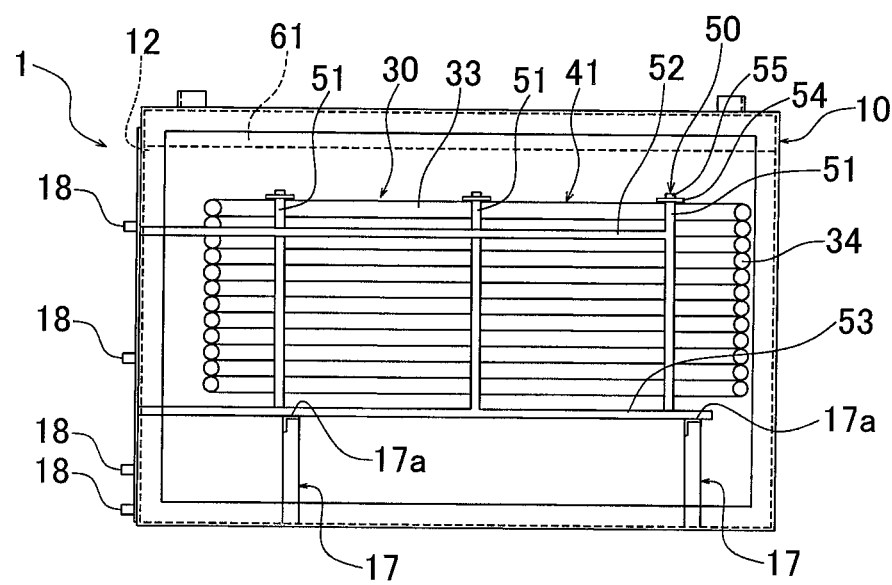
FIG. 2 is a view illustrating an internal configuration of a heat exchanging apparatus viewed from one side thereof.
Figure 3:
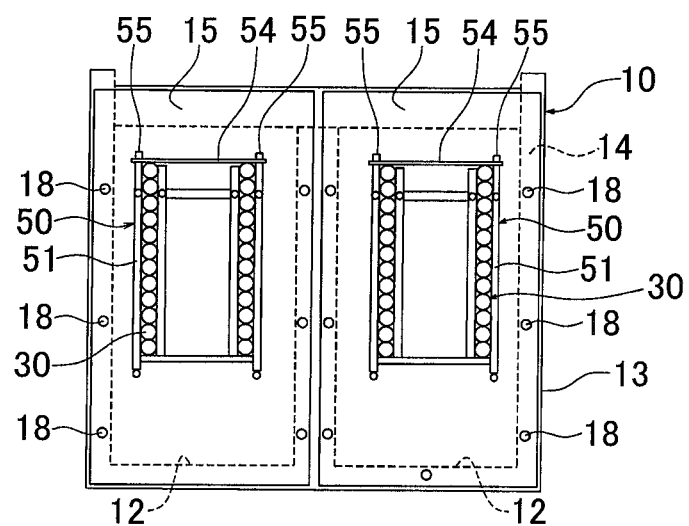
FIG. 3 is a view illustrating an internal configuration of a heat exchanging apparatus viewed from the other side thereof.
Figure 4:
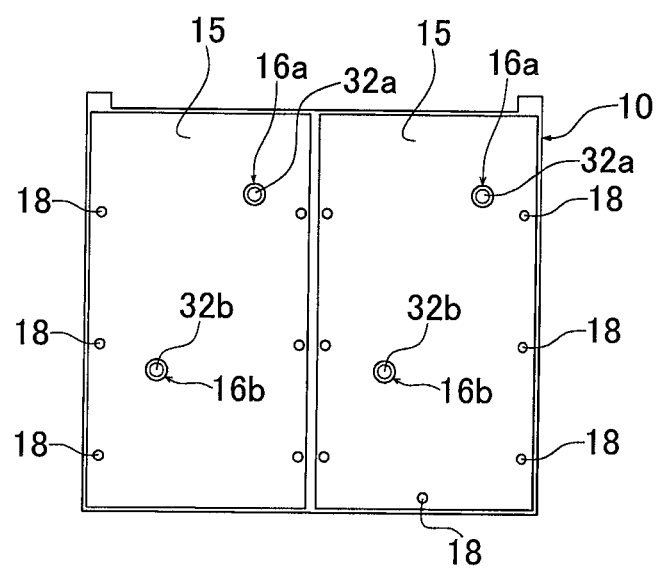
FIG. 4 is a side elevation view illustrating a lid member of a heat exchanging apparatus.
Figure 5:
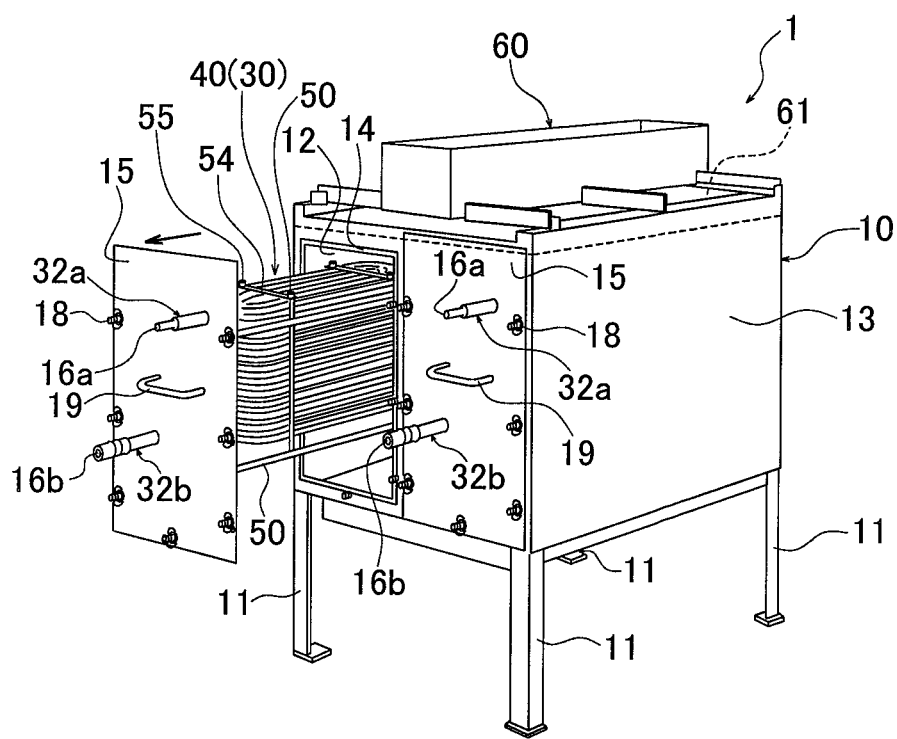
FIG. 5 is a perspective view of a heat exchanging apparatus with a lid member being at an open position.
Figure 6:
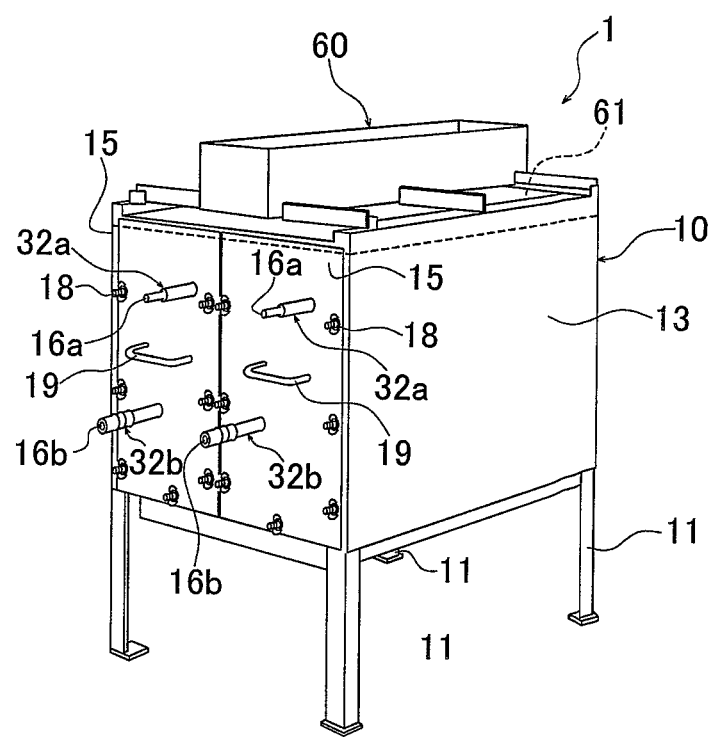
FIG. 6 is a perspective view of a heat exchanging apparatus with a lid member being at a closed position.

Embodiments of the present invention will be described in detail as below with reference to the accompanying drawings. FIGS. 1 to 4 are views illustrating a heat exchanging apparatus according to one embodiment of the present invention, of which FIG. 1 is a plan view, FIG. 2 shows an internal configuration viewed from one side thereof, and FIG. 3 shows an internal configuration viewed from the other side. FIG. 4 is a side elevation view illustrating a lid member, which will be described below. FIGS. 5 and 6 are perspective views of the heat exchanging apparatus, of which FIG. 5 shows the lid member 15, which will be described below, at an open position, and FIG. 6 shows the lid member 15 at a closed position. As shown in these figures, the heat exchanging apparatus 1 of this embodiment is structured so that a heat exchange unit 40 having a heat transfer medium circulating pipe 30 is installed inside a rectangular parallelepiped metal case (box) 10, of which an upper part is open. The heat exchange unit 40 is held (fixed) by a frame member (frame body) 50 inside the case 10 (in detail, on an inner surface of the lid member 15). As shown in FIGS. 5 and 6, the case is supported by four leg members 11 attached to the bottom of the case 10.

As shown in FIGS. 5 and 6, a filter tank 60 and a constant flow tank (heated fluid storage tank) 61 are installed at the upper open part (opening) of the case 10. It should be noted that the filter tank 60 is not illustrated in FIGS. 5 and 6. A filter (not shown in the figures) is installed inside the filter tank 60 for filtering scale included in hot water (heated fluid) flowing into the case 10. In addition, the constant flow tank 61 is a tank that can store the heated fluid provided under the filter tank 60 and at the upper part of the case 10. On the bottom of this constant flow tank 61, a dripping hole (not shown in the figures) is provided for dropping the heated fluid filtered through the filter inside the filter tank 60 into the case 10. This dripping hole consists of a plurality of holes opening right above a heat exchange section 41, which will be described later, in the case 10. By setting these holes at an appropriate diameter and number, the heated fluid is to drop onto the heat exchange section 41 at a desired and constant flow rate. Therefore, the heated fluid that has dropped from this dripping hole is distributed over and flown down the surface of the pipe 30 of the heat exchange section 41 while forming liquid film along the surface of the pipe 30.

A metallic material with satisfactory thermal conductivity and corrosion resistance is suitably employed as a material of the heat transfer medium circulation pipe 30. Two sets of the heat exchange unit 40 attached to the opening section 12 of the case 10 and the lid member 15 are juxtaposed in the width direction of the case 10. In other words, the two opening sections 12 identical in shape are juxtaposed in the width direction on the side surface of the case 10. The two lid members 15 identical in shape are provided respectively at the two opening sections 12 so as to open and close the opening section 12. The two heat exchange units 40 identical in shape are provided respectively to the two lid members 15. In the detailed description of the configuration below, one of the lid members 15 and one of the heat exchange units 40 will be described.

The heat exchange unit 40 is structured to have the heat exchange section (loop section) 41 that is the single metal heat transfer circulation pipe 30 wound up, at the middle thereof, into a small-sized slim oval shape in plan view. In addition, both ends (an upper end 32a and a lower end 32b) of the heat transfer medium circulation pipe 30 penetrate the lid member 15 to project outside the case 10. The upper end 32a of the heat transfer medium circulation pipe 30 serves as a heat transfer medium drain port 16a provided on the upper part of the lid member 15. The lower end 32b of the heat transfer medium circulation pipe 30 serves as a heat transfer medium inflow port 16b provided on the lower part of the lid member 15.

The lid member 15 is spaced from a sidewall 13 of the case 10 for opening the opening section 12 on one hand, and abuts on the outer surface of the sidewall 13 for blocking up the opening section 12 on the other hand. It should be noted that a sealing member (packing) 14 intervenes between the lid member 15 and the sidewall 13 of the case 10 for sealing up a gap therebetween. Accordingly, the opening section 12 on the sidewall 13 can be closed in the sealed state (liquid-tight state) using the lid member 15 at the closed position.

The heat exchange section 41 of the heat transfer medium circulation pipe 30 has a straight line section 33 extending in the longitudinal direction and a curved section 34. The curved section 34 has a U-shaped form into which both ends of the straight line section are curved. The whole of the heat exchange section 41 is formed into a slim oval-shaped loop. And, the heat exchange section 41 of this heat transfer medium circulation pipe 30 is attached to the inner surface of the lid member 15 using the frame member 50 formed by combining a plurality of stick members. Thus, by moving the lid member 15 between the open position and the closed position, the heat exchange section 41 of the heat transfer medium circulation pipe 30 attached to the lid member 15 can slide in and out from the opening section 12.

The frame member 50 consists of a vertical bar 51, an upper cross bar 52 and a lower cross bar 53. A plurality of vertical bars 51 (three in the figures) are installed at a regular interval along the longitudinal direction of the heat transfer medium circulation pipe 30. The upper crossbar 52 extends in the lateral direction connecting upper parts of the plurality of vertical bars 51. The lower crossbar 53 extends in the lateral direction connecting lower parts of the plurality of vertical bars 51. In addition, a presser plate 54 extending in the width direction (direction orthogonal to the longitudinal direction) of the heat transfer medium circulation pipe 30 is installed at an upper end of the vertical bar 51. The presser plate 54 is fixed to the upper end of the vertical bar 51 by fastening a fixture 55 consisting of a bolt and a nut. Thus, the heat exchange section 41 of the heat transfer medium circulation pipe 30 is sandwiched between the presser plate 54 and the lower crossbar 53 so as to fix the heat transfer medium circulation pipe 30. In detail, the heat exchange section 41 is fixed so as to be sandwiched by the presser plate 54 and the lower crossbar 53 from both sides in the axial direction of the spiral winding of the heat exchange section 41.

The frame member 50 is mounted at the upper end 17a of a slim board-shaped support leg 17 vertically disposed on the inner bottom of the case 10 and extending in the width direction. The support leg 17 is installed at each of front and rear positions. The lower crossbar 53 is stretched between the upper ends of the two support legs when the lid member 15 is at the closed position.

When the lid member 15 is, as shown in FIG. 6, at the closed position, the heat exchange unit 40 (heat transfer medium circulation pipe 30) is, as shown in FIG. 1, arranged at the center in the case 10. When the lid member 15 is at the closed position, the lid member 15 can be fixed to the sidewall 13 of the case 10 with a bolt 18. Thus, via the lid member 15 and the frame member 50, the heat exchange unit 40 (heat transfer medium circulation pipe 30) is fixed to the case 10. On the other hand, as shown in FIG. 5, when the lid member 15 is at the open position, the heat exchange unit 40 (heat transfer medium circulation pipe 30) is withdrawn out of the case 10 from the opening section 12. In this manner, the heat exchanging apparatus 1 of this embodiment is configured to slide the heat exchange unit 40 (heat transfer medium circulation pipe 30) fixed to the lid member 15 with the frame material 50 in and out from the opening section 12 respectively when closing and opening the opening section 12 using the lid member 15.

In the heat exchanging apparatus 1 of this embodiment, the heat transfer medium such as tap water injected from the heat transfer medium inflow port 16b of the heat transfer medium circulation pipe 30 circulates in the heat exchange section 41 of the heat transfer medium circulation pipe 30 and is drained out from the heat transfer medium drain port 16a. Furthermore, as described above, the heated fluid dropping from the dripping hole at the center of the bottom of the filter tank 60 is distributed over and flown down the surface of the pipe of the heat exchange section 41 while forming a liquid film along the surface of the pipe. Accordingly, heat exchange is performed between the heat transfer medium that circulates inside the heat transfer medium circulating pipe 30 and the heated fluid that flows down the surface of the heat transfer medium circulation pipe 30.

As described above, the heat exchanging apparatus 1 of the present embodiment includes the boxy case 10 open upward and the heat exchange unit 40 having the heat transfer medium circulation pipe 30 installed in the case 10. The heat exchanging apparatus 1 performs heat exchange between the heated fluid guided into the case 10 and the heat transfer medium circulating in the heat transfer medium circulation pipe 30. The case 10 includes the opening section 12 provided on the sidewall 13 thereof and the plate-like lid member 15 for opening and closing the opening section 12. The heat transfer medium circulation pipe 30 of the heat exchange unit 40 has the heat exchange section 41 wound in spiral, and the heat exchange section 41 of the pipe is fixed to the inner surface of the lid member 15 via the frame body 50 formed by combining the bar-like members. Both ends of the heat transfer medium circulation pipe 30 penetrates the lid member 15 to project outside the case 10. On one hand, when the lid member 15 is at the position where the opening section 12 is closed, the heat exchange section 41 of the heat transfer medium circulation pipe 30 is housed fixedly in the case 10, and on the other hand, when the lid member 15 is at a position where the opening section 12 is open, the heat exchange section 41 of the heat transfer medium circulation pipe 30 is withdrawn out of the case 10 from the opening section 12.

In the heat exchanging apparatus 1 of the present embodiment, when the lid member 15 is at a position where the opening section 12 is closed, the heat exchange section 41 of the heat transfer medium circulation pipe 30 is housed fixedly in the case 10, and when the lid member 15 is at a position where the opening section 12 is open, the heat exchange section 41 of the heat transfer medium circulation pipe 30 is withdrawn out of the case 10 from the opening section 12. Thus, at the time of cleaning and maintenance of the heat exchanging apparatus 1, the heat exchange section 41 of the heat transfer medium circulation pipe 30 can be withdrawn out of the case 10 only by positioning the lid member 15 at the open position to open the opening section 12. This enables highly efficient cleaning and maintenance of the heat exchanging apparatus 1.

Furthermore, in this heat exchanging apparatus 1, the heat exchange section 41 of the heat transfer medium circulation pipe 30 is fixed to the inner surface of the lid member 15 via the frame body 50 formed by combining the bar-like members. Thus, contrary to the heat exchange section 41 of the heat transfer medium circulation pipe 30 structured not to be fixed in the case 10, the pipe of the heat exchange section 41 of the present invention is arranged orderly. This enables more uniform heat exchange between the heat transfer medium circulating in the heat transfer medium circulating pipe 30 and the heated fluid. Thus, the efficiency of heat exchange (efficiency of heat recovery) using the heat exchanging apparatus 1 can be improved effectively.

Furthermore, the heat exchange section 41 of the heat transfer medium circulation pipe 30 is fixed to the inner surface of the lid member 15 via the frame body formed by combining the bar-like members. Thus, no deviation occurs to the installation position of the heat exchange section 41 of the heat transfer medium circulation pipe 30 when opening and closing the lid member 15. Therefore, only by arranging the lid member 15 at the closed position, the heat exchange section 41 of the heat transfer medium circulation pipe 30 can be positioned accurately at a desired position in the case 10. This can also avoid any deviation from occurring to the position of the heat exchange section 41 of the heat transfer medium circulation pipe 30 installed in the case 10 while using the apparatus 1.

Moreover, in the heat exchanging apparatus 1, the frame body 50 is structured to be fixed so that the heat exchange section 41 of the heat transfer medium circulation pipe 30 is sandwiched from both sides in the axial direction of the spiral winding thereof.

According to this configuration, as adjacent parts of the spirally wound heat exchange section 41 of the heat transfer medium circulating pipe 30 can be contacted surely with each other, the flow of the heated fluid circulating around the heat transfer medium circulating pipe 30 can be made uniform. Thus, the efficiency of heat exchange using the heat exchanging apparatus 1 (efficiency of heat recovery) can be much more improved.

Moreover, the above-described heat exchanging apparatus 1 is structured so that the lid member 15 and the heat exchange unit 40 fixed to the lid member 15 slidably move toward and from the opening section 12 of the case 10. According to this configuration, the heat exchange unit 40 fixed to the lid member 15 can slide in and out of the case 10 in a simple configuration with a minimized piece-part count.

The heat exchanging apparatus 1 includes the sealing member 14 for sealing up a gap between the lid member 15 at the closed position and the opening section 12. According to this configuration, as the gap between the lid member 15 and the opening section 12 is sealed surely by arranging the lid member 15 at the closed position, the heated fluid in the case 10 can be prevented surely from leaking from the opening section 12 out of the case 10.

Furthermore, the heat exchanging apparatus 1 is the falling liquid film type for exchanging heat with the heat transfer medium circulating in the heat transfer medium circulation pipe 30 while dropping the heated fluid from the opening of the case open upward into the case 10 so as to be distributed and flown down in the liquid film form following the outer surface of the heat transfer medium circulation pipe 30.

In the heat exchanging apparatus 1 of the present invention, the pipe of the heat exchange section 41 is arranged orderly, or in other words, the adjacent parts of the spirally wound heat exchange section 41 of the heat transfer medium circulation pipe 30 are surely contacted with each other. This enables the heated liquid to be more uniformly distributed and flown down in the liquid film form following the outer surface of the heat transfer medium circulation pipe 30. Thus, highly efficient heat exchange can be performed between the heated liquid and the heat transfer medium circulating in the heat transfer medium circulation pipe 30.

While one embodiment of the invention has been described above, the invention is not limited to the above-mentioned embodiment but various modifications are possible within the scope of the technical idea as defined in the claims, the specification, and the drawings. For example, the apparatus of the present invention is applicable not only to cooling of drink or a spring source, but also, as a heat exchange apparatus in need of moderate temperature regulation, to a wide range of fields.

INDUSTRIAL APPLICABILITY

In the present day, a boiler is an essential heat exchanger in various industrial fields, and thus employed at various places including hot springs, industrial and agricultural facilities and private houses. For instance, by directly heating a cold spring with a boiler, thermal water components (sludge) cause malfunction, deterioration and adhesion of the boiler, thereby not only entailing unreasonable costs for maintenance, but also shortening the life of the boiler. Under such circumstances, use of the apparatus of the present invention together with the boiler to supply hot water as a heat transfer medium from the boiler and circulate the hot water between the boiler and the heat exchanger can prevent malfunction of the boiler and improve fuel consumption. In addition, exhaust heat from the boiler can be used effectively. Furthermore, processing of the exhaust heat and then lowering of exhaust heat temperature can reduce $CO_2$ and contribute to environmental conservation.

Furthermore, in the fields of food and beverage, cooling of products immediately after heating processing enables immediate container filling, whereby productivity improves. Also, quick container filling prevents damage of flavors. To sum up, the heat exchanger for liquid can be applied to a wide range of industrial fields, seeking to expand the field of application by changing materials of the apparatus.

The invention claimed is:

1. A heat exchanging apparatus comprising:
   a boxy case open upward; and
   a heat exchange unit having a heat transfer medium circulation pipe installed at least in part in the case,
   wherein the heat exchanging apparatus performs heat exchange between heated fluid guided into the case and heat transfer medium circulating in the heat transfer medium circulation pipe,
   wherein the heat exchanging apparatus is a falling liquid film type for exchanging heat with the heat transfer medium circulating in the heat transfer medium circulation pipe while dropping heated fluid from an opening of the case open upward into the case so as to be distributed and flown down in a liquid film form following an outer surface of the heat transfer medium circulation pipe, wherein the case comprises: an opening section provided on a sidewall of the case; and a plate-like lid member for opening and closing the opening section, wherein the heat transfer medium circulation pipe of the heat exchange unit has a heat exchange section wound in a spiral, wherein the heat exchange section is fixed to an inner surface of the lid member using a frame body formed by combining bar-like members, wherein both ends of the heat transfer medium circulation pipe penetrate the lid member to project outside the case, and wherein when the lid member is at a position where the opening is closed, the heat exchange section of the heat transfer medium circulation pipe is housed fixedly in the case and when the lid member is at a position where the opening is open, the heat exchange section of the heat transfer medium circulation pipe is withdrawn out of the case.

2. The heat exchanging apparatus according to claim 1, wherein the frame body is fixed by fastening a bolt while the heat exchange section of the heat transfer medium circulation pipe is sandwiched from both sides in an axial direction of a spiral winding of the heat exchange section.

3. The heat exchanging apparatus according to claim 1, wherein the lid member and the heat exchange unit fixed to the lid member slidably move toward and from the opening section of the case.

4. The heat exchanging apparatus according to any one of claim 1, comprising a sealing member for sealing up a gap between the lid member at the closed position and the opening section.

5. The heat exchanging apparatus according to claim 1,
wherein a heated fluid storage tank for storing the heated fluid is installed on an upper part of the case, and
wherein the heated fluid storage tank is configured to drop a constant amount of the heated fluid onto the heat transfer medium circulation pipe in the case.

* * * * *